United States Patent
Valtonen (10) Patent No.: US 11,604,599 B2
(45) Date of Patent: Mar. 14, 2023

(54) METHODS AND APPARATUS FOR USE IN SANITIZING A NETWORK OF NON-VOLATILE MEMORY EXPRESS DEVICES

(71) Applicant: Blancco Technology Group IP OY, Joensuu (FI)

(72) Inventor: Markku Valtonen, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 0 days.

(21) Appl. No.: 17/269,953

(22) PCT Filed: Sep. 9, 2019

(86) PCT No.: PCT/EP2019/074005
§ 371 (c)(1),
(2) Date: Feb. 19, 2021

(87) PCT Pub. No.: WO2020/053156
PCT Pub. Date: Mar. 19, 2020

(65) Prior Publication Data
US 2021/0318828 A1    Oct. 14, 2021

(30) Foreign Application Priority Data
Sep. 13, 2018   (GB) ...................................... 1814918

(51) Int. Cl.
*G06F 3/06* (2006.01)

(52) U.S. Cl.
CPC .......... *G06F 3/0652* (2013.01); *G06F 3/0605* (2013.01); *G06F 3/0634* (2013.01); *G06F 3/0653* (2013.01); *G06F 3/0688* (2013.01)

(58) Field of Classification Search
CPC .... G06F 3/0652; G06F 3/0634; G06F 3/0688; G06F 3/0605; G06F 3/0653
(Continued)

(56) References Cited

U.S. PATENT DOCUMENTS

2015/0006663 A1   1/2015 Huang
2015/0319237 A1   11/2015 Hussain et al.
(Continued)

FOREIGN PATENT DOCUMENTS

WO   2014006274   1/2014

OTHER PUBLICATIONS

ISA; International Preliminary Report on Patentability dated Jul. 31, 2020 in Application No. PCT/EP2019/074005.
(Continued)

*Primary Examiner* — Hashem Farrokh
(74) *Attorney, Agent, or Firm* — Dickinson Wright PLLC (57) ABSTRACT

A method for use in sanitizing a network of non-volatile memory express devices, comprises identifying the configuration of the network of non-volatile memory express devices including identifying one or more controllers of the non-volatile memory express devices; and identifying which portions of non-volatile memory of the non-volatile memory express devices are accessible to which of the identified controllers. The method further comprises performing a data erasure process in relation to at least one portion of the non-volatile memory of at least one of the non-volatile memory express devices based at least in part on the identified configuration of the network.

19 Claims, 4 Drawing Sheets

(58) Field of Classification Search
USPC .................................................. 711/154, 103
See application file for complete search history.

(56) References Cited

U.S. PATENT DOCUMENTS

| | | | |
|---|---|---|---|
| 2016/0085718 A1* | 3/2016 | Huang | H04L 67/1097 |
| | | | 709/213 |
| 2017/0060451 A1 | 3/2017 | Hayes et al. | |
| 2017/0344295 A1 | 11/2017 | Sheffi et al. | |
| 2018/0307851 A1* | 10/2018 | Lewis | G06F 21/44 |
| 2018/0341606 A1* | 11/2018 | Bolkhovitin | G06F 3/0656 |
| 2019/0102250 A1* | 4/2019 | O'Krafka | G06F 3/064 |

OTHER PUBLICATIONS

UK; Search Report dated Mar. 14, 2019 in Application No. GB1814918.7.

ISA; International Search Report dated Nov. 20, 2019 in Application No. PCT/EP2019/074005.

* cited by examiner

METHODS AND APPARATUS FOR USE IN SANITIZING A NETWORK OF NON-VOLATILE MEMORY EXPRESS DEVICES

CROSS-REFERENCE TO RELATED APPLICATIONS

This application is a national stage application of PCT/EP2019/074005, filed on Sep. 9, 2019, entitled "METHODS AND APPARATUS FOR USE IN SANITIZING A NETWORK OF NON-VOLATILE MEMORY EXPRESS DEVICES", which claims priority to GB Application No. 1814918.7, filed on Sep. 13, 2018, which are hereby incorporated by reference in their entirety for all purposes.

FIELD

The present disclosure relates to a method and apparatus for use in sanitizing a network of non-volatile memory express devices, and in particular, though not exclusively, for repurposing and/or decommissioning a network of non-volatile memory express devices.

BACKGROUND

Recent developments in storage technology have led to a new host controller interface, Non-Volatile Memory express (NVMe), which is specifically aimed at flash-based non-volatile memory devices or Solid State Drives (SSDs). Built specifically to exploit the benefits offered by flash memory, the NVMe specification includes many characteristic features. For example, the NVMe specification supports namespaces, where a namespace is a portion of non-volatile memory (NVM). Each namespace may be formatted into logical blocks and referenced using an identifier. The NVMe specification may be the NVMe Specification 1.3c which was released on 24 May 2018 and which is referred to herein as "the NVMe Base Standard".

Figure 1:
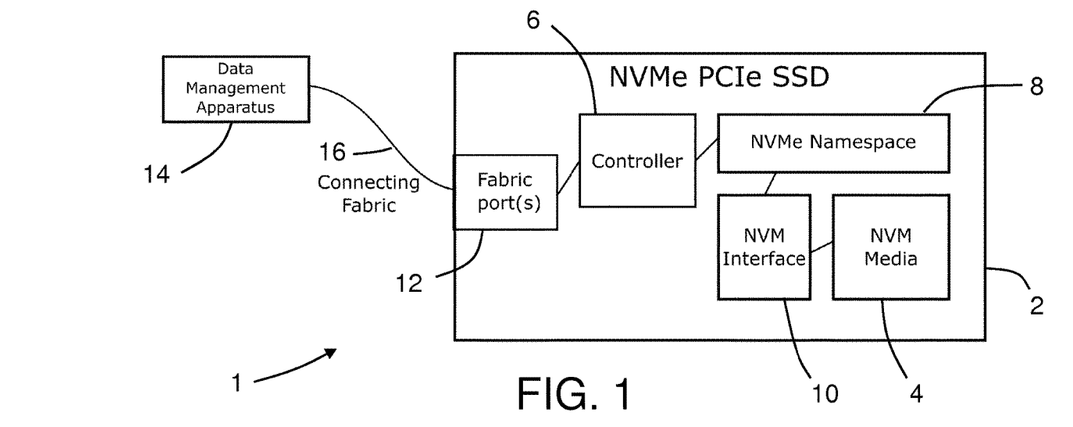
FIG. 1 is a schematic illustration of a known NVMe system.

FIG. 1 shows a known NVMe system which is generally designated 1 and which includes a single NVMe SSD device which is generally designated 2, a data management apparatus 14 for controlling the storage of data to, and/or the erasure of data from, the NVMe SSD device 2, and a connecting fabric in the form of a PCIe bus 16 connecting the NVMe SSD device 2 and the data management apparatus 14. The NVMe SSD device 2 includes non-volatile memory in the form of NVM media 4 for the storage of data. The NVM media 4 defines one or more namespaces for the storage of data. The NVMe SSD device 2 further includes a NVMe controller 6, a group, store or register 8 of one or more namespace identifiers, a non-volatile memory interface 10 between the NVMe controller 6 and the NVM media 4, and a fabric port 12.

In use, the data management apparatus 14 communicates with the NVMe controller 6 via the PCIe bus 16 and the fabric port 12 to store data in, and/or erase from, the one or more namespaces of the NVM media 4. One of skill in the art will understand that the data management apparatus 14 includes a processing resource (not shown) and a memory (now shown) wherein the memory stores a computer program which, when executed by the processing resource, causes the data management apparatus 14 to control the storage of data to, and/or the erasure of data from, the NVMe SSD device 2.

Figure 2:
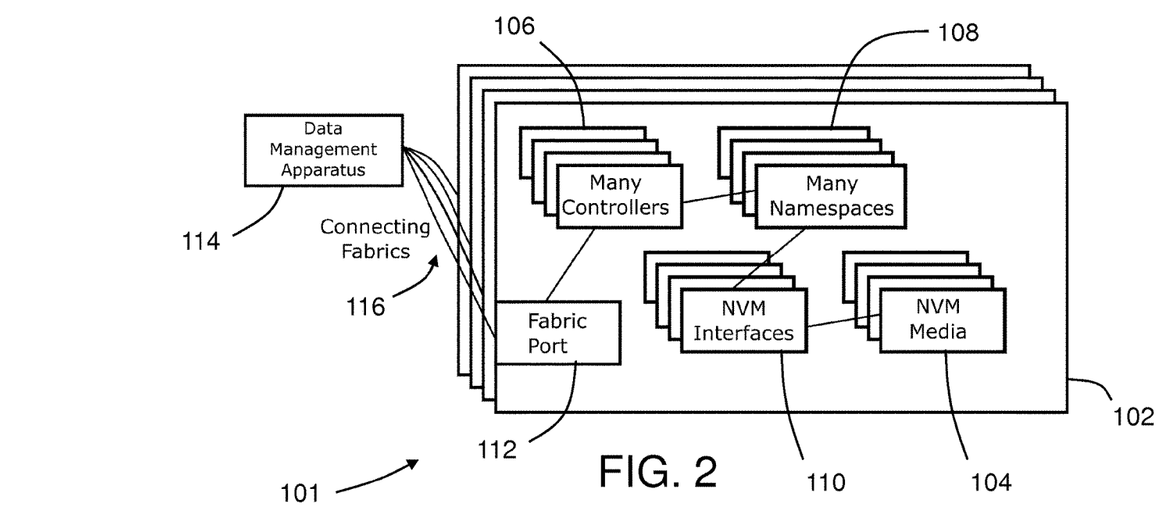
FIG. 2 is a schematic illustration of a known NVMeOF system and a data management apparatus for use in writing data to, and/or erasing data from, the NVMeOF system.

In Data Centre and Enterprise environments, large mass storage arrays may comprise multiple, for example thousands of, NVMe devices. The NVMe devices may be presented to a user as one large mass storage media, but physically there may be a large number of NVMe devices residing in physically separated locations interconnected via a very fast connecting medium or fabric. The network of NVMe devices may be compliant with the NVM Express over Fabrics (NVMeOF) Specification 1.0a which was released on 23 Jul. 2018 and which is referred to herein as "the NVMeOF Standard". For example, FIG. 2 shows a known generic NVMeOF system which is generally designated 101 and which includes multiple, for example thousands of, NVMe SSD devices 102, a data management apparatus 114 for controlling the storage of data to, and/or the erasure of data from, the NVMe SSD devices 102, and a network fabric connection 116, such as a Fibre Channel (FC) or Remote Direct Memory Access (RDMA) network or fabric, for example, which connects the NVMe SSD devices 102 to each other to form an NVMe subsystem. The network fabric connection 116 further connects the NVMe SSD devices 102 to the data management apparatus 114. Here Fibre Channel (FC) may comprise electrical or optical signalling. The NVMeOF system 101 includes multiple, for example thousands of, NVM media 104 for the storage of data. Each NVM media 104 may define one or more namespaces for the storage of data. The NVMeOF system 101 further includes multiple, for example thousands of, NVMe controllers 106, a group, store or register 108 of multiple, for example thousands of, namespace identifiers, a non-volatile memory interface 110 between the NVMe controllers 106 and the NVM media 104, and multiple fabric ports 112. In use, the data management apparatus 114 communicates with the NVMe controllers 106 via the network fabric connection 116 and the fabric ports 112 to store data in, and/or erase from, the namespaces of the NVM media 104. One of skill in the art will understand that the data management apparatus 114 includes a processing resource (not shown) and a memory (now shown) wherein the memory stores a computer program which, when executed by the processing resource, causes the data management apparatus 114 to control the storage of data to, and/or the erasure of data from, the NVMe SSD devices 102.

The architecture of the NVMeOF system 101 is defined so that the NVMe protocol may be supported across a variety of storage networking conduits, such as Ethernet, Fibre Channel, TCP/IP or InfiniBand. These fast networking protocols allow the data management apparatus 114 to use exactly the same command set to access remote storage at speeds comparable to those speeds that would have been attainable if the storage had been attached directly to the data management apparatus 114. NVMeOF enables the creation of a storage system comprised of many NVMe SSD devices 102 to provide extremely high performance while maintaining the very low latency available via NVMe.

However, it may be difficult to determine a suitable method for reliably sanitizing the NVMe devices 102 of the NVMeOF system 101.

SUMMARY

It should be understood that any of the features of any one of the following aspects or embodiments may apply alone or in any combination in relation to any one or more of the other aspects or embodiments.

According to an aspect or embodiment of the present disclosure there is provided a method for use in sanitizing a network of non-volatile memory express devices, wherein each non-volatile memory express device comprises at least one controller and non-volatile memory, wherein at least a portion of the non-volatile memory of at least one of the non-volatile memory express devices is accessible to at least one controller of the same non-volatile memory express device and/or is accessible to at least one controller of at least one of the other non-volatile memory express devices, and wherein the method comprises:

identifying the configuration of the network of non-volatile memory express devices including:
identifying one or more of the controllers of the non-volatile memory express devices; and
identifying which portions of the non-volatile memory of the non-volatile memory express devices are accessible to which of the identified controllers; and
wherein the method further comprises performing a data erasure process in relation to at least one portion of the non-volatile memory of at least one of the non-volatile memory express devices based at least in part on the identified configuration of the network.

Performing the data erasure process in relation to at least one portion of the non-volatile memory of at least one of the non-volatile memory express devices may comprise executing a data erasure procedure to erase data from the at least one portion of the non-volatile memory of at least one of the non-volatile memory express devices.

Such a method may allow a part or whole of a network of non-volatile memory express devices to be sanitized completely, successfully (for example in compliance with a predetermined erasure standard) and/or reliably.

Such a method may be advantageous, for example where the non-volatile memory express devices are interconnected in a complex network which is not visible or which is not immediately apparent to a user of the non-volatile memory express devices and/or, for example, where a lack of knowledge or incomplete understanding about the configuration of the network could result in the application of an erasure procedure which is inappropriate or incorrect.

Such a method may be advantageous, for example where it is possible for a portion of the non-volatile memory of a non-volatile memory express device to be shared between different NVMe controllers of the same NVMe device or to be shared between different NVMe controllers of different NVMe devices, and where it is possible that the portion of the non-volatile memory of the non-volatile memory express device concerned cannot be erased as it may be reserved by another NVMe controller. In addition, such a method may be advantageous, for example where a portion of the non-volatile memory of a non-volatile memory express device may be unallocated or inaccessible to any of the NVMe controllers of any of the NVMe devices of the network of non-volatile memory express devices. Furthermore, such a method may be advantageous, for example where one or more of the NVMe controllers of one or more of the NVMe devices of the network of non-volatile memory express devices may be visible to a data management apparatus without being accessible to the data management apparatus. In other words, such a method may be advantageous, for example where the data management apparatus can detect the presence of one or more of the NVMe controllers of the NVMe devices of the network of non-volatile memory express devices but that one or more of the NVMe controllers of the NVMe devices of the network of non-volatile memory express devices is not permitted to act on instructions received from the data management apparatus.

Such a method may be advantageous, for example where the NVMe devices of the network of non-volatile memory express devices are of an unknown type or different types e.g. where different NVMe devices are manufactured by different manufacturers, where different NVMe devices have different functionality or capabilities, and/or where different NVMe devices have different feature sets enabled. In particular, such a method may be advantageous, for example where it is difficult to determine a suitable method for reliably sanitizing the NVMe devices of the network of non-volatile memory express devices in a manner which is appropriate or compliant with an erasure standard, which is efficient and/or which is optimal.

The network of non-volatile memory express devices may comprise an NVM Express over Fabrics (NVMeOF) system. Such a method may be used to centrally detect and/or identify a network of individual NVMe devices such as a NVMeOF network and erase data from one or more of the NVMe devices.

The non-volatile memory express devices may be configured for communication with each other via at least one of:
Ethernet;
Fibre Channel;
TCP/IP
InfiniBand; and
Remote Direct Memory Access (RDMA).

Identifying the configuration of the network of non-volatile memory express devices may comprise identifying all of the controllers of the non-volatile memory express devices of the network of non-volatile memory express devices.

Such a method may be employed to exhaustively map the configuration of all of the controllers of all of the non-volatile memory express devices of the network of non-volatile memory express devices.

The method may consider the context of data erasure when applied to NVMe devices and the potential for the association of complex architectures underpinning the NVMeOF system. Through the application of an exhaustive detection mechanism, coupled with granular control of erasure and verification options, the method may expose critical information that allows a suitable erasure process to be identified and avoids potential misinterpretation or improper or accidental erasure of assets.

The method considers the inherent complexity, and provides guidance to facilitate decision making in order to achieve desired erasure goals through the effective discovery, analysis and erasure of an NVMe device or a network or collection of NVMe devices found in a NVMeOF system. The method considers the different configurations and enables the most effective and informative results.

Identifying the configuration of the network of non-volatile memory express devices may comprise identifying which, if any, of the identified controllers are inaccessible and therefore not permitted to act in response to instructions relating to the data erasure process.

The method may comprise reconfiguring any one or more inaccessible controllers to make any such one or more inaccessible controllers accessible and therefore permitted to act in response to instructions relating to the data erasure process.

The method may comprise raising an alarm, notifying a user of, or alerting a user to, the presence of any one or more inaccessible controllers.

Identifying the configuration of the network of non-volatile memory express devices may comprise identifying any one or more unallocated portions of the memory of any of the non-volatile memory express devices which are, at least initially, visible, but inaccessible, to any of the identified controllers.

The data erasure process may comprise assigning any one or more unallocated portions of the memory of any of the non-volatile memory express devices to at least one of the identified controllers to make any such one or more unallocated portions of the memory of any of the non-volatile memory express devices accessible to at least one of the identified controllers. Such a method may be used to erase data from any unallocated portions of the memory of any of the non-volatile memory express devices.

The data erasure process may comprise raising an alarm, notifying a user of, or alerting a user to, the presence of any one or more unallocated portions of the memory of any of the non-volatile memory express devices. This may allow the user to take any suitable action, such as physically disposing of one or more of the non-volatile memory express devices having unallocated portions of memory. Such a method may avoid the possibility that there are parts of the non-volatile memory of the NVMe device that may not be erased or that these parts of the non-volatile memory may be hidden from the user.

For example, if a whole NVMe device is being retired or repurposed but part of its physical storage is shared with another controller, such a method may avoid the possibility that the NVMe device is only partially erased or verified, for example without knowledge of the user.

Identifying the configuration of the network of non-volatile memory express devices may comprise identifying a measure of health of one or more of the non-volatile memory express devices. For example, identifying the configuration of the network of non-volatile memory express devices may comprise identifying a temperature related flag or counter of one or more of the non-volatile memory express devices.

Identifying the configuration of the network of non-volatile memory express devices may comprise identifying the configuration of any partitions in the memory of one or more of the non-volatile memory express devices.

One or more of the portions of the non-volatile memory of the non-volatile memory express devices may comprise one or more namespaces. At least one of the namespaces of at least one of the non-volatile memory express devices may be accessible to at least one controller of the same non-volatile memory express device and/or may be accessible to at least one controller of at least one of the other non-volatile memory express devices.

Identifying the configuration of the network of non-volatile memory express devices may comprise identifying one or more of the namespaces.

Identifying the configuration of the network of non-volatile memory express devices may comprise identifying which of the identified namespaces are accessible to which of the identified controllers.

The method may comprise performing the data erasure process in relation to at least one of the namespaces of at least one of the non-volatile memory express devices based at least in part on the identified configuration of the network.

Such a method may be advantageous, for example where it is possible for a namespace to be shared between different NVMe controllers of the same NVMe device or for a namespace to be shared between different NVMe controllers of different NVMe devices, and where the namespace concerned cannot be erased as it may be reserved by another NVMe controller.

Such a method may be advantageous, for example where individual namespaces within the same NVMe device have different properties, for example depending on their format. Such a method may be advantageous, for example where one or more of the namespaces associated with an NVMe device support a different erasure process than the other namespaces associated with the same NVMe device. Such a method may be advantageous, for example where different namespaces associated with different NVMe devices support different erasure processes for similar reasons.

Identifying the configuration of the network of non-volatile memory express devices may comprise identifying all of the namespaces of the non-volatile memory express devices of the network of non-volatile memory express devices.

Identifying the configuration of the network of non-volatile memory express devices may comprise identifying one or more inaccessible namespaces which are, at least initially, visible to one or more of the identified controllers but inaccessible to all of the identified controllers, or which are, at least initially, visible to one or more of the identified controllers but not accessible to any of the identified controllers.

The data erasure process may comprise assigning any one or more inaccessible namespaces to at least one of the identified controllers to make any such one or more inaccessible namespaces accessible to at least one of the identified controllers. Such a method may be used to erase data from any such one or more inaccessible namespaces.

The data erasure process may comprise raising an alarm, notifying a user of, or alerting a user to, the presence of any one or more inaccessible namespaces. This may allow the user to take any suitable action, such as physically disposing of one or more of the non-volatile memory express devices having one or more inaccessible namespaces.

The data erasure process may comprise providing authentication to gain access to any one or more inaccessible namespaces and/or to allow erasure of data stored in any one or more inaccessible namespaces.

The data erasure process may comprise removing any reservations which prevent access to any one or more inaccessible namespaces and/or which prevent erasure of data stored in any one or more inaccessible namespaces.

Identifying the configuration of the network of non-volatile memory express devices may comprise identifying, for each identified namespace or each namespace in relation to which the data erasure process is to be performed, one or more properties of the namespace.

The identified one or more properties of the namespace may comprise formatting information such as logical block addressing (LBA) formatting information.

The identified one or more properties of the namespace may comprise metadata.

The identified one or more properties of the namespace may comprise protection information.

The identified one or more properties of the namespace may comprise an indication of whether the namespace is shared or private.

The identified one or more properties of the namespace may comprise an indication of whether the namespace is active or inactive.

The identified one or more properties of the namespace may comprise an indication of whether end-to-end protection is enable or disabled.

The identified one or more properties of the namespace may comprise an indication of any one or more data erasure procedures which are suitable for erasing data from the namespace. For example, the identified one or more properties of the namespace may comprise an indication of any one or more data erasure procedures supported by one or more of the controllers to which the namespace is accessible and/or any one or more data erasure procedures supported by the non-volatile memory express device which includes the non-volatile memory which defines the namespace.

The data erasure process may comprise selecting, for each non-volatile memory express device in relation to which the data erasure process is to be performed, the data erasure procedure based at least in part on one or more properties of each non-volatile memory express device. The data erasure process may comprise selecting, for each non-volatile memory express device in relation to which the data erasure process is to be performed, the data erasure procedure from a database or a look-up table of data erasure procedures, wherein the database or look-up table includes one or more properties of a non-volatile memory express device together with one or more corresponding suitable data erasure procedures.

The data erasure process may comprise selecting, for each portion of the non-volatile memory of at least one of the non-volatile memory express devices in relation to which the data erasure process is to be performed, the data erasure procedure based at least in part on one or more properties of each portion of the non-volatile memory of at least one of the non-volatile memory express devices. The data erasure process may comprise selecting, for each portion of the non-volatile memory of at least one of the non-volatile memory express devices in relation to which the data erasure process is to be performed, the data erasure procedure from a database or a look-up table of data erasure procedures, wherein the database or look-up table includes one or more properties of a portion of the non-volatile memory of a non-volatile memory express devices together with one or more corresponding suitable data erasure procedures.

The data erasure process may comprise selecting, for each namespace in relation to which the data erasure process is to be performed, a data erasure procedure based at least in part on the identified one or more properties of each namespace. The data erasure process may comprise selecting, for each namespace in relation to which the data erasure process is to be performed, the data erasure procedure from a database or a look-up table of data erasure procedures, wherein the database or look-up table includes one or more properties of a namespace together with one or more corresponding suitable data erasure procedures. The data erasure process may comprise selecting, for each namespace in relation to which the data erasure process is to be performed, a data erasure procedure based at least in part on a required erasure standard for each namespace.

The data erasure procedure may comprise a native data erasure procedure and/or a data erasure procedure defined in firmware.

The data erasure procedure may comprise a cryptographic erasure procedure.

The data erasure procedure may comprise writing data over data stored in the memory of one or more of the non-volatile memory express devices.

The data erasure procedure may comprise applying a Force Unit Access (FUA) flag to force data to be written over data stored in the memory of one or more of the non-volatile memory express devices during execution of the data erasure procedure.

The data erasure procedure may comprise atomic-writing data over data stored in the memory of one or more of the non-volatile memory express devices.

Identifying the configuration of the network of non-volatile memory express devices may comprise identifying the presence or availability of a namespace management interface.

The method may comprise, responsive to identifying the presence or availability of a namespace management interface:
recording an initial configuration of the identified controllers and the identified namespaces;
modifying the initial configuration of the identified controllers and the identified namespaces before performing the data erasure process in relation to at least one of the identified namespaces; and
restoring the initial configuration of the identified controllers and the identified namespaces after performing the data erasure process in relation to at least one of the identified namespaces.

Modifying the initial configuration of the identified controllers and the identified namespaces may comprise creating a single or global namespace which is accessible to at least one of the identified controllers and which includes all of the addressable locations in the memories of the non-volatile memory express devices. Such a method may allow the NVMe devices to be remotely dismantled for efficient, optimal or thorough sanitization/erasure and to be subsequently reconfigured or restored to their initial configuration without the need to physically access the NVMe devices. Namespace management is an optional feature, so not always supported by an NVMe device. Use of such a method may mean that it is not necessary for a user of the method to have requisite skills and technologies to determine the presence or availability of a namespace management interface.

Identifying the configuration of the network of non-volatile memory express devices may comprise determining the connected NVMe devices and accessible namespaces. Such a method may provide the ability to discover the available paths to an NVMe device or subsystem.

Identifying the configuration of the network of non-volatile memory express devices may comprise identifying any NVMeOF configuration.

Identifying the configuration of the network of non-volatile memory express devices may comprise identifying shared namespaces along with those namespaces that are inaccessible to the identified controllers.

Identifying the configuration of the network of non-volatile memory express devices may comprise determining whether the NVMe device is part of a bigger NVMe system such as a NVMeOF system, for example whether the NVMe device is a node of a bigger NVMe system such as a NVMeOF system.

Identifying the configuration of the network of non-volatile memory express devices may comprise determining how erasure operations affect namespaces e.g. do they apply to one or all of the namespaces of a NVMe device.

Identifying the configuration of the network of non-volatile memory express devices may comprise identifying namespaces on a specific NVMe device and/or controller.

Identifying the configuration of the network of non-volatile memory express devices may comprise determining any possible authentication requirements which may bar access to one or more namespaces to be erased (e.g. OPAL).

Identifying the configuration of the network of non-volatile memory express devices may comprise identifying any reservations to data intended for erasure.

The method may comprise acquiring and/or removing reservations in order to access reserved namespaces for data erasure.

Identifying the configuration of the network of non-volatile memory express devices may comprise identifying the availability of a Management Interface (MI). The MI can provide additional functionality/information. This may be important to the detection and erasure process, e.g. the MI can provide additional functionality/information about any unallocated NVM Capacity (UNVMCAP). The UNVMCAP field may indicate the unallocated NVM capacity in the NVMe device or subsystem. The value may be in bytes. This field may be supported if Namespace Management and Namespace Attachment commands are supported.

Since all manner of configurations is possible the method may allow a user to be informed of the architecture of the network or NVMe system for erasure. The method can not only determine any directly attached (local) NVMe SSDs but also other connected NVMe devices or subsystems. The method may also ascertain the accessible and/or shared namespaces, and any fabric configurations or namespaces that are inaccessible to the data management apparatus performing the method for use in sanitizing a network of non-volatile memory express devices. By performing a thorough or exhaustive detection process, the method can inform a user of the underlying arrangement and, for example, issue warnings that the NVMe device or subsystem and/or the data management apparatus is part of a bigger NVMe system and/or there are inaccessible regions of storage present. This provides the basis for making the correct decisions regarding the erasure operation deployed.

Identifying the configuration of the network of non-volatile memory express devices may comprise reading the current configuration of the attached NVMe devices.

Identifying the configuration of the network of non-volatile memory express devices may comprise identifying the current controller structure.

Identifying the configuration of the network of non-volatile memory express devices may comprise identifying whether there is any unallocated and/or free space in the memory of any of the NVMe devices or subsystems. The method may comprise bringing any unallocated and/or free space in the memory of any of the NVMe devices or subsystems into use or alerting the user about the unallocated and/or free space and the fact that some physical storage space that cannot be accessed.

Identifying the configuration of the network of non-volatile memory express devices may comprise identifying which namespaces are associated with different controllers and details for each namespace.

Identifying the configuration of the network of non-volatile memory express devices may comprise identifying LBA formatting (metadata, protection information).

Identifying the configuration of the network of non-volatile memory express devices may comprise identifying shared/private namespaces.

Identifying the configuration of the network of non-volatile memory express devices may comprise identifying which namespaces are active, inactive, attached and/or present.

Identifying the configuration of the network of non-volatile memory express devices may comprise identifying whether end-to-end protection is enabled or disabled.

Identifying the configuration of the network of non-volatile memory express devices may comprise identifying whether partitions exist in the memory of one or more of the NVMe devices or subsystems.

Identifying the configuration of the network of non-volatile memory express devices may comprise identifying the presence of any (Self-Monitoring, Analysis and Reporting Technology (S.M.A.R.T.) data and/or any Vital Product Data (VPD) pages.

Identifying the configuration of the network of non-volatile memory express devices may comprise identifying whether reservations are supported and/or whether there are reservations active.

Identifying the configuration of the network of non-volatile memory express devices may comprise discovering and/or detecting any or all directly or remotely attached devices.

Identifying the configuration of the network of non-volatile memory express devices may comprise identifying the configuration of said devices before determining the erasure options.

Identifying the configuration of the network of non-volatile memory express devices may comprise determining the structure of the controllers that are present within each NVMe device.

Identifying the configuration of the network of non-volatile memory express devices may comprise determining if there is any unallocated/free space present in a memory of an NVMe device or the wider system. The method may comprise attaching the unallocated space in order to provide access to all of the potential addressable storage and achieve the erasure requirements. Conversely, the method may comprise alerting a user if there is no option or functionality to expose the unallocated space to the data management apparatus, thus enabling the user to make better decisions regarding the data erasure process.

The method may comprise determining the effect of erasing a namespace. This may be important if erasing a namespace cascades down to several other physical devices in the same or different network or system. Knowing if an erasure operation applies to one or all namespaces on a specific device/controller may be highly desirable prior to initialising the data erasure process.

Health information may also be valuable at this stage (good, bad, unknown). For example, the method may comprise querying the NVMe device or subsystem for health specific information. The method may comprise informing a user if there are any areas that could be close to imminent failure, prior to sanitization. Such a method may facilitate a different disposition decision as devices close to failure could be destroyed.

The method may comprise taking a snapshot or storing the configuration of an NVMe device or system such as an NVMeOF system e.g. so that a user can retain the original configuration and have this re-applied after sanitizing.

Identifying the configuration of the network of non-volatile memory express devices may comprise identifying the presence of, and/or characterising any, partitioning. Identifying the configuration of the network of non-volatile memory express devices may comprise identifying the LBA formatting. Identifying the configuration of the network of non-volatile memory express devices may comprise identifying any protection information.

The method may comprise modifying the capabilities and properties of one or more NVMe devices or subsystems prior to erasure. The method may comprise modifying the configuration of one or more NVMe devices to create a 'global' namespace.

If there is a complex configuration of one or more NVMe devices present that requires modification to achieve the erasure goals, it may be pertinent to store the original configuration of the one or more NVMe devices in order to re-apply the configuration of the one or more NVMe devices post erasure.

The method may comprise reconfiguring the namespaces of one or more NVMe devices if namespace management is supported. For example the method may comprise at least one of: clearing the previous namespace configuration; removing one or more reservations; detaching one or more namespaces; and deleting one or more namespaces.

If namespace management is not supported, the method may comprise using the existing namespace configuration. For example the method may comprise at least one of: reserving one or more namespaces and iterating through the existing namespaces.

If namespace management is supported, the method may comprise creating a single 'global' namespace that applies to all addressable locations of a NVMe device.

The method may comprise preparing a NVMe device for erasure. Preparing a NVMe device for erasure may comprise modifying the namespace configuration to reveal all of the available storage by assigning unallocated NVM storage to a namespace or attaching namespaces that were previously detached. Preparing a NVMe device for erasure may comprise modifying the LBA formatting for a region. Preparing a NVMe device for erasure may comprise removing any partitioning schemes present.

The data erasure process may be selected according to a data erasure standard being followed. The data erasure process may comprise one or more data erasure procedures. Each data erasure procedure may be selected according to the configuration, attributes and/or properties of the non-volatile memory, namespace and/or NVMe device to be erased. Each data erasure procedure may comprise a data overwriting procedure. Each data erasure procedure may be a firmware-based data erasure procedure. Each data erasure procedure may comprise a combination of both a data overwriting procedure and a firmware-based data erasure procedure.

The data erasure process may comprise changing an LBA format, if requested. This can improve the speed of erasure. This may require a reformat of the namespace.

The data erasure process may comprise investigating the possibility to use fused operations (compare and write).

The data erasure process may comprise using a Force Unit Access (FUA) field and/or setting a FUA flag. The FUA field or flag indicates that data shall be written to non-volatile media before indicating command completion. There is no implied ordering with other commands. This may improve the visibility of erasure as it may ensure that the data is written to the physical storage.

A FUA field or flag may specify that data is to be read from non-volatile media. This may ensure that data is read from the NVM and that buffered or otherwise cached data is not read. This may result in more control, especially if the devices are sitting inside a storage enclosure. This may reduce the need to manually flush the cache.

The data erasure process may comprise determining whether the memory of one or more NVMe devices contains user data.

The data erasure process may comprise reading data from the memory of one or more NVMe devices that contains user data. Here user data refers to data written during the data erasure process in a format predefined by the data erasure process.

The data erasure process may comprise determining whether a namespace is formatted to contain metadata.

The data erasure process may comprise using an appropriate write command based at least in part upon whether a namespace is formatted to contain metadata.

The data erasure process may comprise filling in an appropriate parameter in a write command based at least in part upon whether a namespace is formatted to contain metadata.

The data erasure process may comprise using atomic writes. Using atomic writes may extend the flash media life by up to a factor of two. Using atomic writes can increase the life of flash media up to 2× due to reduction in writea-head-logging and double-write buffering.

The data erasure process may comprise determining whether the memory of one or more NVMe devices contains user data.

The data erasure process may comprise only writing data to the memory of one or more NVMe devices that contains user data. The data erasure process may additionally comprise reading data from the memory of one or more NVMe devices that contains user data, and/or verifying cryptographic erasure, for example.

The data erasure process may be controlled by, and/or defined in, firmware. The erasure process may comprise checking crypto erase capabilities (per namespace, per capacity etc.)

The data erasure process may comprise one or more data overwriting procedures or one or more firmware-based data erasure procedures or a combination of both.

The data erasure process may comprise performing one or more verification actions to ensure that data erasure was successful.

The data erasure process may comprise performing one or more reservation actions to restrict access to targeted namespaces.

The correct identification and/or detection process can provide the necessary control over the erasure process to ensure that different scenarios are serviced and/or may enable simple 'erase everything' options through to identifying and erasing specific namespaces located locally or remotely.

In NVMe subsystems, particularly in the case when devices are connected across a NVMeOF network, namespaces may be accessed by more than one NVMe device or NVMe controller. A situation where a shared namespace needs to be erased requires a reservation process in order to lock if from being accessed by another NVMe device or NVMe controller.

The data erasure process may comprise overwriting. Overwriting may be the chosen method for the erasure of a NVMe device, because erasure standards may dictate the need to overwrite exclusively or in conjunction with firmware-based methods.

The data erasure process may comprise only writing data to the memory of one or more NVMe devices that contains user data. This may remove the need to write data to NVMe devices unnecessarily. There are actions that can be taken to expedite the overwriting process on an NVMe SSD and retain improved efficacy of the data erasure process. The time taken to overwrite a device depends on its size. Modern SSDs can be many terabytes in size and are increasing all the time, and despite the speed still take time to overwrite. The data erasure process may comprise using fused operations. A fused operation combines two actions to speed up the process. The data erasure process may comprise using a 'compare and write' function on NVMe devices. This may remove the need to write data to NVMe devices unnecessarily.

The data erasure process may comprise applying the Force Unit Access (FUA) flag. Applying the FUA flag may ensure that data is written to the non-volatile media, as opposed to the cache. This may ensure that data is written to the storage and are not retained in a cache. Since this command can force data to be written to non-volatile media before indicating completion, greater assurance can be attained.

The data erasure process may comprise determining whether an identified or detected namespace is formatted to contain metadata.

If it is determined an identified or detected namespace is formatted to contain metadata, the data erasure process may comprise setting the appropriate parameter in a write command to cause the overwriting process to handle the removal of metadata, which may be otherwise retained and could (theoretically) contain sensitive information.

The data erasure process may comprise using atomic writes. Atomic writes can increase the life of flash media up to 2× due to a reduction in writeahead-logging and double-write buffering. Atomic writes may guarantee that data will be written atomically to the NVM across all namespaces with any supported namespace format during normal operation.

The data erasure process may comprise establishing the firmware erasure capabilities available to one or more of the identified namespaces. The data erasure process may comprise applying the firmware erasure to the erasure target.

The data erasure process may comprise considering both secure and non-secure erasure options.

The data erasure process may comprise applying a Format command of the NVMe specification. The application of a Format command in the NVMe specification considers both secure and non-secure erasure options.

The data erasure process may comprise providing a feedback loop to ensure that the user can clearly identify which operation is performed on a particular storage target. Enabling granular control will also improve the experience and reduce the potential for errors to occur during the data erasure process.

The data erasure process may comprise specifying that the format operation applies to the whole of the NVMe device instead of specific namespaces, to erase as much data as possible from the memory of a given NVMe device. This kind of control may be desirable in situations where users are retiring assets from their current use and all data should be erased. The application of a blanket erase operation can reduce complexity in environments where whole systems are being erased and granular understanding of the subsystem is not required.

The data erasure process may comprise verification of erasure of data.

Different verification operations may be supported according to the configuration of an NVMe device (i.e. exposing all possible addressable memory). The data erasure process may comprise using Force Unit Access (FUA). The use of FUA means that the NVMe device is forced to read directly and not from any previously buffered data. This is important for data erasure as the potential security risks could be incurred if an error in the erasure process was not detected due to reading data from a cache instead of the NVMe storage media.

The method may comprise determining and storing an original configuration of the NVMe hardware before performing the data erasure process.

The method may comprise creating a single (global) namespace before performing the data erasure process. Use of such a single (global) namespace may allow verification to apply to the greatest possible surface of a NVMe device.

The method may comprise removing any reservations once the data erasure process is complete.

The method may comprise re-applying the original configuration of the NVMe hardware once the data erasure process is complete.

According to an aspect or embodiment of the present disclosure there is provided a computer program for a data management apparatus which, when executed by a processing resource of the data management apparatus, causes the data management apparatus to perform any of the methods described previously.

According to an aspect or embodiment of the present disclosure there is provided a data management apparatus for use in sanitizing a network of non-volatile memory express devices, wherein each non-volatile memory express device comprises at least one controller and non-volatile memory, wherein at least a portion of the non-volatile memory of at least one of the non-volatile memory express devices is accessible to at least one controller of the same non-volatile memory express device and/or is accessible to at least one controller of at least one of the other non-volatile memory express devices, and wherein the data management apparatus comprises: a processing resource configured for communication with each of the non-volatile memory express devices, wherein the processing resource is further configured to cause the data management apparatus to perform any of the methods described previously.

The network of non-volatile memory express devices may comprise an NVM Express over Fabrics (NVMeOF) system.

Such a data management apparatus may be used to centrally detect and/or identify a network of individual NVMe devices such as a NVMeOF network and store data in, and/or erase data from, one or more of the NVMe devices.

The non-volatile memory express devices may be configured for communication with each other and the processing resource via at least one of:

Ethernet;
Fibre Channel;
TCP/IP
InfiniBand; and
Remote Direct Memory Access (RDMA).

The data management apparatus may comprise a memory storing a computer program which, when executed by the data management apparatus causes the data management apparatus to perform any of the methods described previously.

The data management apparatus may be configured to select, for each non-volatile memory express device in relation to which the data erasure process is to be performed, the data erasure procedure based at least in part on one or more properties of each non-volatile memory express devices. The data management apparatus may be configured to select the data erasure procedure from a database or look-up table of data erasure procedures, wherein the database or look-up table includes one or more properties of a non-volatile memory express device together with one or more corresponding suitable data erasure procedures.

The data management apparatus may be configured to select, for each portion of the non-volatile memory of at least one of the non-volatile memory express devices in relation to which the data erasure process is to be performed, the data erasure procedure based at least in part on one or more properties of each portion of the non-volatile memory of at least one of the non-volatile memory express devices.

The data management apparatus may be configured to select, for each portion of the non-volatile memory of at least one of the non-volatile memory express devices in relation to which the data erasure process is to be performed, the data erasure procedure from a database or look-up table of data erasure procedures, wherein the database or look-up table includes one or more properties of the non-volatile memory of a non-volatile memory express device together with one or more corresponding suitable data erasure procedures.

The data management apparatus may be configured to select, for each namespace in relation to which the data erasure process is to be performed, a data erasure procedure based at least in part on the identified one or more properties of each namespace. The data management apparatus may be configured to select the data erasure procedure from a database or look-up table of data erasure procedures, wherein the database or look-up table includes one or more properties of a namespace together with one or more corresponding suitable data erasure procedures.

The data management apparatus may be configured to store one or more different data erasure procedures. For example, the data management apparatus may be configured to store one or more different data erasure procedures in the memory of the data management apparatus.

The data management apparatus may be configured to store the database or look-up table of data erasure procedures.

The database or look-up table may be stored remotely from the data management apparatus in a remote storage device. The data management apparatus may be configured to receive the data erasure procedure from the remote storage device.

The database or look-up table may include at least one of:
one or more properties of a non-volatile memory express device together with one or more corresponding suitable data erasure procedures;
one or more properties of the non-volatile memory of a non-volatile memory express device together with one or more corresponding suitable data erasure procedures; and
one or more properties of a namespace together with one or more corresponding suitable data erasure procedures.

It should be understood that any of the features of any one of the aspects or embodiments described above may apply alone or in any combination in relation to any one or more of the other aspects or embodiments described above.

BRIEF DESCRIPTION OF THE DRAWINGS

Methods and apparatus for use in sanitizing non-volatile memory express devices are described herein by way of non-limiting example only with reference to the following drawings of which.

DETAILED DESCRIPTION OF THE DRAWINGS

One of skill in the art will understand that one or more of the features of the embodiments described below with reference to the drawings may produce effects or provide advantages when used in isolation from one or more of the other features of the embodiments and that different combinations of the features are possible other than the specific combinations of the features of the embodiments described below.

Figure 3:
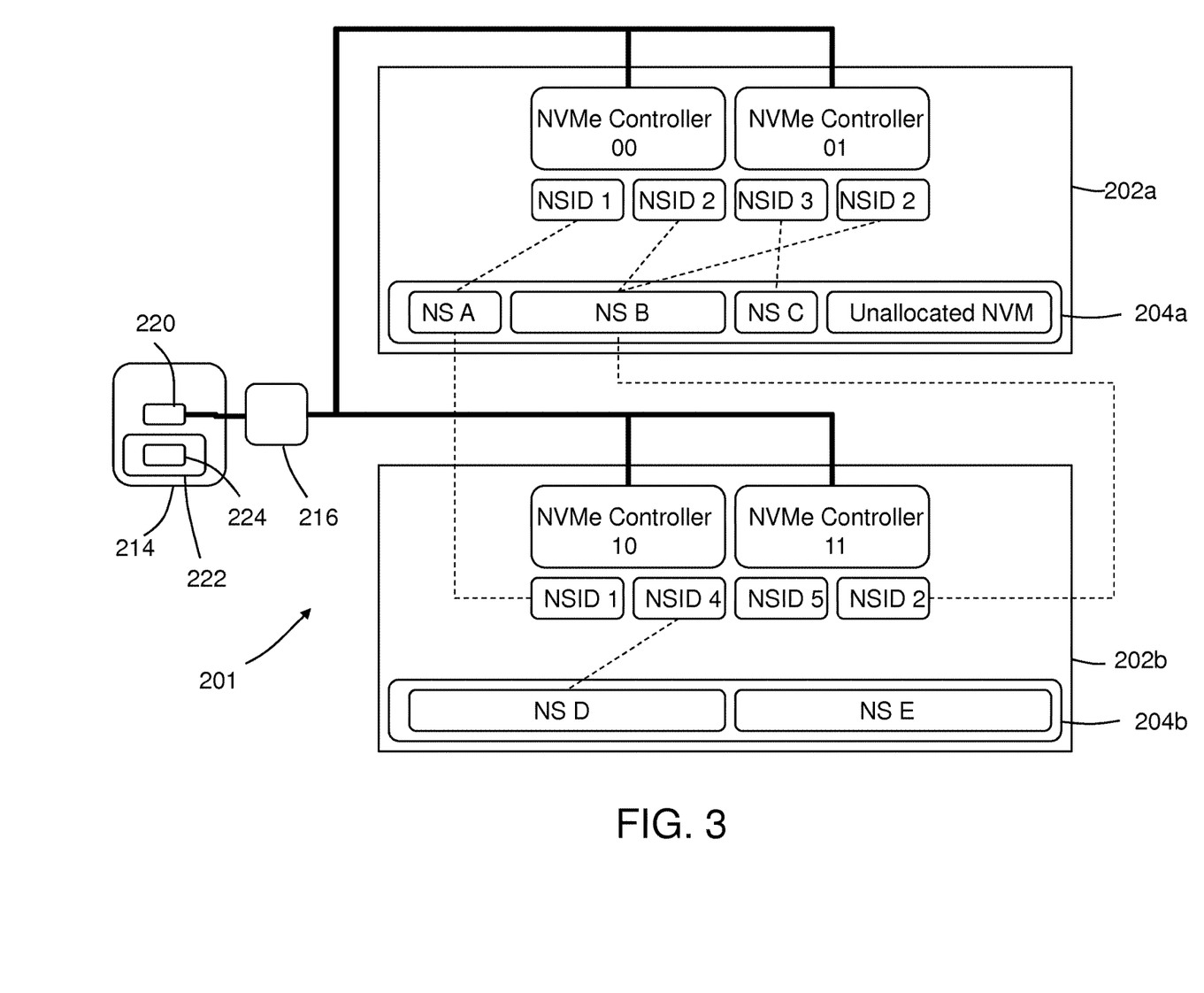
FIG. 3 is a schematic illustration of an NVMeOF system and a data management apparatus for use in sanitizing a network of non-volatile memory express devices of the NVMeOF system.

FIG. 3 schematically illustrates an example of an NVMeOF system 201 including first and second NVMe devices 202a and 202b respectively, a data management apparatus 214 for storing data in, and/or erasing data from, the first and second NVMe devices 202a, 202b, and a FC RDMA network or fabric 216. It should be understood that the NVMeOF system 201 of FIG. 3 only includes two NVMe devices 202a, 202b in the interests of clarity. However, one of ordinary skill in the art will understand that the number of NVMe devices may be greater than two, for example the number of NVMe devices may be of the order of thousands. The data management apparatus 214 includes a processing resource 220 and a memory 222 storing a computer program 224. As will be described in more detail below, when executed by the processing resource 220, the computer program 224 causes the data management apparatus 214 to perform a method for use in sanitizing the network of non-volatile memory express devices i.e. for use in sanitizing the first and second NVMe devices 202a and 202b.

The first NVMe device 202a includes two NVMe controllers, "NVMe Controller 00" and "NVMe Controller 01", and non-volatile memory 204a. The non-volatile memory 204a includes four portions including three namespaces, "NS A", "NS B" and "NS C". Each namespace, "NS A", "NS B" and "NS C", has a corresponding namespace identifier "NSID 1", "NSID 2" and "NSID 3" respectively.

Similarly, the second NVMe device 202b includes two NVMe controllers, "NVMe Controller 10" and "NVMe Controller 11", and non-volatile memory 204b. The non-volatile memory 204b includes two portions in the form of two namespaces, "NS D" and "NS E". Each namespace, "NS D" and "NS E", has a corresponding namespace identifier "NSID 4" and "NSID 5" respectively.

As indicated by the dashed lines in FIG. 3, namespace "NS A" is accessible to "NVMe Controller 00" of the first NVMe device or subsystem 202a and "NVMe Controller 10" of the second NVMe device or subsystem 202b; namespace "NS B" is accessible to "NVMe Controller 00" and "NVMe Controller 01" of the first NVMe device 202a and "NVMe Controller 11" of the second NVMe device 202b; namespace "NS C" is accessible only to "NVMe Controller 01" of the first NVMe device or subsystem 202a; and namespace "NS D" is accessible only to "NVMe Controller 10" of the second NVMe device 202b. However, namespace "NS E" is not accessible to any of the controllers of either the first or second NVMe devices 202a, 202b. Also, a portion "Unallocated NVM" of the non-volatile memory 204a of the first NVMe device 202a is unallocated i.e. the portion "Unallocated NVM" of the non-volatile memory 204a does not define any namespaces and is not accessible to any of the NVMe controllers, "NVMe Controller 00", "NVMe Controller 01", "NVMe Controller 10" and "NVMe Controller 11".

Figure 4:
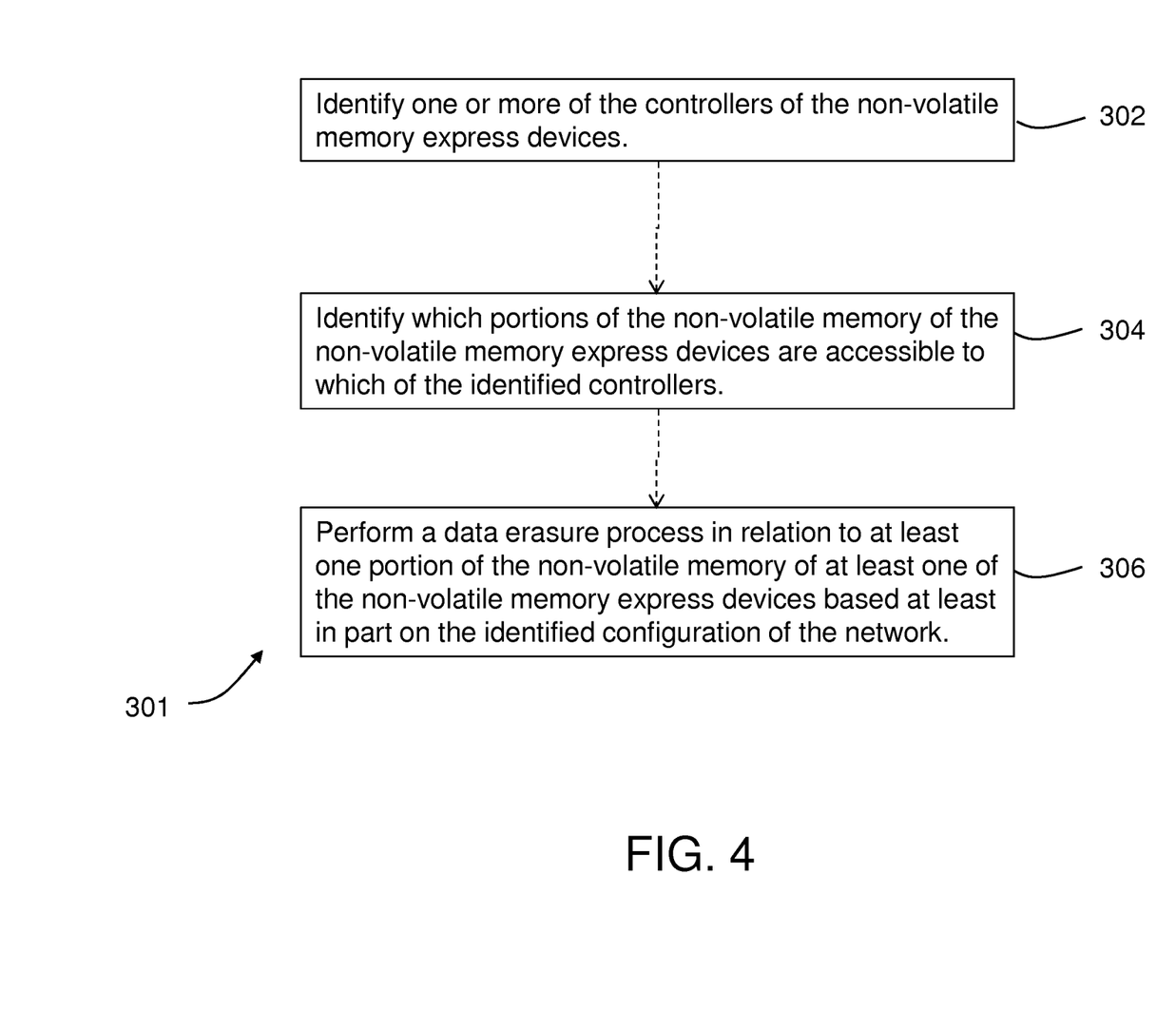
FIG. 4 is a schematic illustration of a method for use in sanitizing the network of non-volatile memory express devices of the NVMeOF system of FIG. 3.

Referring to FIG. 4 there is shown a method 301 for use in sanitizing a network of non-volatile memory express devices such as the NVMeOF system 201 of FIG. 3. The method 301 identifies the configuration of the network of non-volatile memory express devices 202a, 202b at steps 302 and 304. More specifically, at 302, the data management apparatus 214 identifies one or more of the controllers, "NVMe Controller 00", "NVMe Controller 01", "NVMe Controller 10" and "NVMe Controller 11", of the non-volatile memory express devices 202a, 202b. In particular, the data management apparatus 214 and one or more of controllers, "NVMe controller 00", "NVMe controller 01", "NVMe controller 10" and "NVMe controller 11", communicate via the FC RDMA network or fabric 216 using an NVMe protocol across at least one of Ethernet, Fibre Channel, TCP/IP and InfiniBand for this purpose.

Identifying the configuration of the network of non-volatile memory express devices 202a, 202b continues at 304 with the data management apparatus 214 identifying which portions of the non-volatile memory of the non-volatile memory express devices 202a, 202b are accessible to which of the identified controllers "NVMe Controller 00", "NVMe Controller 01", "NVMe Controller 10" and "NVMe Controller 11". In particular, the data management apparatus 214 communicates with one or more of the controllers "NVMe controller 00", "NVMe controller 01", "NVMe controller 10" and "NVMe controller 11" to identify one or more of namespaces, "NS A", "NS B", "NS C", "NS D" and "NS E", based on the corresponding namespace identifiers "NSID 1", "NSID 2", "NSID 3", "NSID 4" and "NSID 5".

At 306, the data management apparatus 214 performs a data erasure process in relation to at least one portion of the non-volatile memory of at least one of the non-volatile memory express devices 202a, 202b based at least in part on the identified configuration of the network. More specifically, the data management apparatus 214 communicates with at least one of the identified one or more controllers "NVMe controller 00", "NVMe controller 01", "NVMe controller 10" and "NVMe controller 11" so as to perform a data erasure process in relation to one of the identified namespaces "NS A", "NS B", "NS C", "NS D" and "NS E" based at least in part on the configuration of the network identified at steps 302 and 304. Since namespace "NS E" is not accessible, at least initially, to any of the identified controllers "NVMe controller 00", "NVMe controller 01", "NVMe controller 10" and "NVMe controller 11", erasure of data from namespace "NS E" is not possible, at least initially. Performing the data erasure process in relation to at least one portion of the non-volatile memory of at least one of the non-volatile memory express devices 202a, 202b may include executing a data erasure procedure to erase data from the at least one portion of the non-volatile memory of at least one of the non-volatile memory express devices 202a, 202b. This may, for example, allow data to be erased from any one or more of the accessible namespaces "NS A", "NS B", "NS C" and "NS D".

One of ordinary skill in the art will understand that various other modifications may be made to the methods and data management apparatus for sanitizing non-volatile memory express devices described above without departing from the scope of the present invention as defined by the appended claims. For example, identifying the configuration of the network of non-volatile memory express devices 202a, 202b may include the data management apparatus 214 identifying all of the controllers "NVMe controller 00", "NVMe controller 01", "NVMe controller 10" and "NVMe controller 11". This may be achieved by, for example, using a discovery service specified by the NVMeOF Standard or other means specified by the NVMe Base Standard.

Identifying the configuration of the network of non-volatile memory express devices 202a, 202b may include the data management apparatus 214 identifying which, if any, of the identified controllers "NVMe controller 00", "NVMe controller 01", "NVMe controller 10" and "NVMe controller 11" are inaccessible to the data management apparatus 214 in the sense that any controllers concerned are not permitted to act in response to instructions received from the data management apparatus 214 relating to the data erasure process.

The method may include reconfiguring any one or more inaccessible controllers to make any such one or more inaccessible controllers accessible to the data management apparatus 214 and therefore permitted to act in response to instructions received from the data management apparatus 214 relating to the data erasure process. The method may comprise raising an alarm, notifying a user of, or alerting a user to, the presence of any one or more inaccessible controllers.

Identifying the configuration of the network of non-volatile memory express devices 202a, 202b may include the data management apparatus 214 identifying any unallocated portions of the memory of any of the non-volatile memory express devices 202a, 202b such as "Unallocated NVM" of the memory of the non-volatile memory express device 202a which is, at least initially, inaccessible to any of the identified controllers "NVMe controller 00", "NVMe controller 01", "NVMe controller 10" and "NVMe controller 11". This may be achieved by, for example, using a discovery service specified by the NVMeOF Standard or other means specified by the NVMe Base Standard.

Performing the data erasure process may include the data management apparatus 214 assigning any one or more unallocated portions of the memory of any of the non-volatile memory express devices 202a, 202b to at least one of the identified controllers "NVMe controller 00", "NVMe controller 01", "NVMe controller 10" and "NVMe controller 11" to make any such one or more unallocated portions of the memory of any of the non-volatile memory express devices 202a, 202b accessible to at least one of the identified controllers "NVMe controller 00", "NVMe controller 01", "NVMe controller 10" and "NVMe controller 11". For example, the data management apparatus 214 may assign the unallocated portion "Unallocated NVM" of the memory of the non-volatile memory express device 202a to one or more of the identified controllers "NVMe controller 00", "NVMe controller 01", "NVMe controller 10" and "NVMe controller 11" to make the unallocated portion "Unallocated NVM" of the memory of the non-volatile memory express device 202a accessible to at least one of the identified controllers "NVMe controller 00", "NVMe controller 01", "NVMe controller 10" and "NVMe controller 11". This may be achieved by, for example, using a discovery service specified by the NVMeOF Standard or other means specified by the NVMe Base Standard. This may allow data to be erased from the unallocated portion "Unallocated NVM" of the memory of the non-volatile memory express device 202a.

Additionally or alternatively, performing the data erasure process may include the data management apparatus 214 raising an alarm, notifying a user of, or alerting a user to, the presence of any one or more unallocated portions of the memory of any of the non-volatile memory express devices 202a, 202b. For example, the data management apparatus 214 may raise an alarm, notify a user of, or alert a user to, the presence of the unallocated portion "Unallocated NVM" of the memory of the non-volatile memory express device 202a so that the user may take any suitable action, such as physically disposing of the non-volatile memory express device 202a.

Identifying the configuration of the network of non-volatile memory express devices 202a, 202b may include the data management apparatus 214 identifying, for each non-volatile memory express device 202a, 202b, a measure of health of the non-volatile memory express device 202a, 202b. For example, the data management apparatus 214 may identify, for each non-volatile memory express device 202a, 202b, a temperature related flag or counter—see the NVMe base standard. It may be helpful of informative to identify a measure of health of each non-volatile memory express device 202a, 202b, because knowledge of the health of the non-volatile memory express devices 202a, 202b device may inform any decision whether to retire or destroy one or both of the non-volatile memory express devices 202a, 202b, for example in preference to performing the erasure process, or sanitizing or re-purposing the non-volatile memory express devices 202a, 202b.

Identifying the configuration of the network of non-volatile memory express devices 202a, 202b may include the data management apparatus 214 identifying the configuration of any partitions in the memory of one or more of the non-volatile memory express devices 202a, 202b.

Identifying the configuration of the network of non-volatile memory express devices 202a, 202b may include the data management apparatus 214 identifying one or more of the namespaces.

Identifying the configuration of the network of non-volatile memory express devices 202a, 202b may include the data management apparatus 214 identifying which of the identified namespaces are accessible to which of the identified controllers.

Identifying the configuration of the network of non-volatile memory express devices 202a, 202b may include the data management apparatus 214 identifying all of the namespaces of the non-volatile memory express devices 202a, 202b. The data management apparatus 214 may communicate with all of the identified controllers "NVMe controller 00", "NVMe controller 01", "NVMe controller 10" and "NVMe controller 11" to identify all of the namespaces "NS A", "NS B", "NS C", "NS D" and "NS E" of the non-volatile memory express devices 202a, 202b.

Identifying the configuration of the network of non-volatile memory express devices 202a, 202b may include the data management apparatus 214 identifying, for each identified controller, all of the namespaces which are accessible to the identified controller. This may be achieved by, for example, using a discovery service specified by the NVMeOF standard or other means specified by the NVMe base standard. The data management apparatus 214 may communicate with all of the identified controllers "NVMe controller 00", "NVMe controller 01", "NVMe controller 10" and "NVMe controller 11" to identify, for each identified controller, all of the namespaces which are accessible to the identified controller. By proceeding in this way, the data management apparatus 214 may exhaustively map the configuration of all of the identified controllers and all of the identified namespaces of all of the NVMe devices or subsystems which form the NVMeOF system 201. This may be achieved by, for example, using a discovery service specified by the NVMeOF standard or other means specified by the NVMe base standard.

Identifying the configuration of the network of non-volatile memory express devices 202a, 202b may include the data management apparatus 214 identifying any one or more inaccessible namespaces, such as namespace "NS E", which is, at least initially, inaccessible to all of the identified controllers "NVMe controller 00", "NVMe controller 01", "NVMe controller 10" and "NVMe controller 11" or which is, at least initially, not accessible to any of the identified controllers "NVMe controller 00", "NVMe controller 01", "NVMe controller 10" and "NVMe controller 11". This may be achieved by, for example, using a discovery service specified by the NVMeOF Standard or other means specified by the NVMe Base Standard.

Performing the data erasure process may include the data management apparatus 214 assigning any one or more inaccessible namespaces to at least one of the identified controllers to make any such one or more inaccessible namespaces accessible to at least one of the identified controllers. For example, performing the data erasure process may include the data management apparatus 214 assigning the inaccessible namespace "NS E", to at least one of the identified controllers "NVMe controller 00", "NVMe controller 01", "NVMe controller 10" and "NVMe controller 11" to make the inaccessible target namespace "NS E" accessible to at least one of the identified controllers "NVMe controller 00", "NVMe controller 01", "NVMe controller 10" and "NVMe controller 11". This may be achieved by, for example, using a discovery service specified by the NVMeOF Standard or other means specified by the NVMe Base Standard.

Additionally or alternatively, performing the data erasure process may include the data management apparatus 214 raising an alarm, notifying a user of, or alerting a user to, the presence of any one or more inaccessible namespaces such as the inaccessible namespace "NS E" so that the user may take any suitable action, such as physically disposing of the non-volatile memory express device 202b.

Performing the data erasure process may include the data management apparatus 214 providing authentication to gain access to any one or more inaccessible namespaces and/or to allow erasure of data stored in any one or more inaccessible namespaces.

Performing the data erasure process may include the data management apparatus 214 removing any reservations which prevent access to any one or more inaccessible namespaces and/or which prevent erasure of data stored in any one or more inaccessible namespaces.

The data management apparatus 214 may identify, for each identified namespace "NS A", "NS B", "NS C", "NS D" and "NS E" or each namespace to be erased, one or more properties of the identified namespace "NS A", "NS B", "NS C", "NS D" and "NS E". For example, the data management apparatus 214 may identify any one or more of the identified controllers "NVMe controller 00", "NVMe controller 01", "NVMe controller 10" and "NVMe controller 11" to which each namespace is attached or accessible. This may allow the data management apparatus 214 to map the configuration of the identified controllers and the identified namespaces of the NVMeOF system 201.

Identifying the configuration of the network of non-volatile memory express devices 202a, 202b may include the data management apparatus 214 identifying, for each identified namespace or each namespace in relation to which the data erasure process is to be performed, one or more properties of the namespace. For example, identifying the configuration of the network of non-volatile memory express devices 202a, 202b may include the data management apparatus 214 identifying, for each of the identified namespaces "NS A", "NS B", "NS C", "NS D" and "NS E" or each namespace in relation to which the data erasure process is to be performed, at least one of: formatting information such as logical block addressing (LBA) formatting information; metadata; protection information; an indication of whether the namespace is shared or private; an indication of whether the namespace is active or inactive; an indication of whether end-to-end protection is enable or disabled; an indication of any one or more data erasure procedures suitable for erasing data from the namespace; and an indication of any one or more data erasure procedures supported by one or more of the controllers to which the namespace is accessible; and an indication of any one or more data erasure procedures supported by the non-volatile memory express device which includes the non-volatile memory which defines the namespace.

The data management apparatus 214 may select, for each namespace in relation to which the data erasure process is to be performed, a data erasure procedure based at least in part on the identified one or more properties of each namespace. Such a method may allow the data management apparatus 214 to select appropriate, efficient or optimum erasure procedures tailored to the individual namespaces to be erased based at least in part on the identified one or more properties.

The data management apparatus 214 may select, for each namespace in relation to which the data erasure process is to be performed, a data erasure procedure based at least in part on a required erasure standard for the namespace. Such a method may allow the data management apparatus 214 to select appropriate erasure procedures tailored to the individual namespaces to be erased which meet an erasure standard such as a customer specified erasure standard for the individual namespaces to be erased and/or which meet an erasure standard specified by regulations or legal requirements for the individual namespaces to be erased.

The data erasure procedure may comprise a native data erasure procedure and/or a data erasure procedure defined in the firmware of one or more of the non-volatile memory express devices 202a, 202b.

The data erasure procedure may comprise a cryptographic data erasure procedure.

The data erasure procedure may comprise writing data over data stored in the memory of one or more of the non-volatile memory express devices 202a, 202b.

The data erasure procedure may comprise applying a Force Unit Access (FUA) flag of one or more of the non-volatile memory express devices 202a, 202b to force data to be written over data stored in the memory of one or more of the non-volatile memory express devices 202a, 202b during execution of the data erasure procedure.

The data erasure procedure may comprise atomic-writing data over data stored in the memory of one or more of the non-volatile memory express devices 202a, 202b.

Identifying the configuration of the network of non-volatile memory express devices 202a, 202b may include the data management apparatus 214 identifying the presence or availability of a namespace management interface and, responsive to determining the presence or availability of the namespace management interface at each of the identified controllers "NVMe controller 00", "NVMe controller 01", "NVMe controller 10" and "NVMe controller 11", the data management apparatus 214 may record an initial configuration of the identified controllers "NVMe controller 00", "NVMe controller 01", "NVMe controller 10" and "NVMe controller 11" and the identified namespaces "NS A", "NS B", "NS C", "NS D" and "NS E". The data management apparatus 214 may then modify the initial configuration of the identified controllers "NVMe controller 00", "NVMe controller 01", "NVMe controller 10" and "NVMe controller 11" and the identified namespaces "NS A", "NS B", "NS C", "NS D" and "NS E" before performing the data erasure process in relation to at least one of the identified namespaces. The data management apparatus 214 may then restore the initial configuration of the identified controllers "NVMe controller 00", "NVMe controller 01", "NVMe controller 10" and "NVMe controller 11" and the identified namespaces "NS A", "NS B", "NS C", "NS D" and "NS E" after performing the data erasure process in relation to at least one of the identified namespaces. For example, the data management apparatus 214 may modify the initial configuration of the identified controllers "NVMe controller 00", "NVMe controller 01", "NVMe controller 10" and "NVMe controller 11" by creating a single or global namespace which is accessible to at least one of the one or more identified controllers "NVMe controller 00", "NVMe controller 01", "NVMe controller 10" and "NVMe controller 11" and which includes all of the addressable locations in the memories of the non-volatile memory express devices 202a, 202b.

Figure 5:
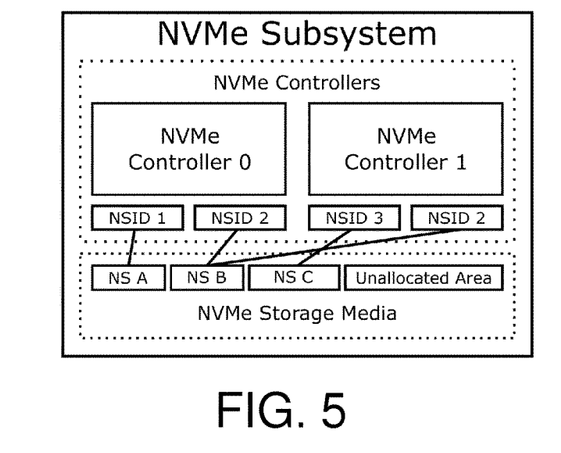
FIG. 5 is a schematic illustrating the arrangement of NVMe controllers and namespaces of an NVMe subsystem including a single NVMe device and the accessibility of different portions of the non-volatile memory of the NVMe device to the NVMe controllers.

One of skill in the art will understand that although the NVMeOF system 201 of FIG. 3 includes first and second NVMe devices 202a and 202b, each NVMe device 202a, 202b including two NVMe controllers, the number of NVMe devices may be greater than or less than two. For example, FIG. 5 schematically illustrates an example of an NVMe subsystem of an NVMeOF system, which NVMe subsystem includes a single NVMe device (not shown explicitly) which includes two NVMe controllers, "NVMe Controller 0" and "NVMe Controller 1" and NVMe Storage Media defining namespaces, "NS A", "NS B" and "NS C". Each namespace "NS A", "NS B" and "NS C" has a corresponding namespace identifier "NSID 1", "NSID 2" and "NSID 3" respectively. As indicated by the solid lines in FIG. 5, each NVMe controller, "NVMe Controller 0" and "NVMe Controller 1", may access one or more of the namespaces, "NS A", "NS B" and "NS C". Specifically, as indicated by the solid lines in FIG. 5, namespace "NS A" is accessible only to "NVMe Controller 0" and namespace "NS C" is accessible only to "NVMe Controller 1", while namespace "NS B" is shared or accessible to both "NVMe Controller 0" and "NVMe Controller 1". Namespace sharing provides the ability for two or more different NVMe controllers to access a shared (common) namespace. As shown in FIG. 5, the NVMe Storage Media also includes an unallocated portion of non-volatile memory which is inaccessible to either of the NVMe controllers, "NVMe Controller 0" and "NVMe Controller 1".

Figure 6:
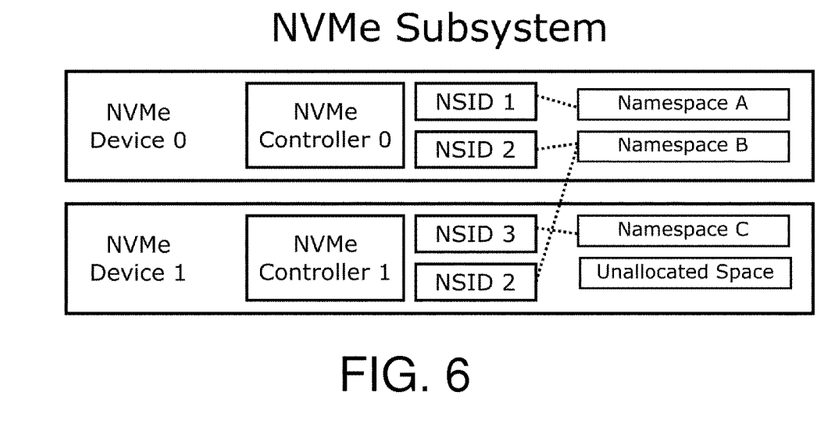
FIG. 6 is a schematic illustrating the arrangement of NVMe controllers and namespaces of an NVMe subsystem including two NVMe devices and the accessibility of different portions of the non-volatile memory of the NVMe devices to the NVMe controllers.

Although the NVMeOF system 201 of FIG. 3 includes first and second NVMe devices 202a and 202b, each NVMe device 202a, 202b including two NVMe controllers, the number of NVMe controllers per NVMe device may be greater than or less than two. For example, FIG. 6 schematically illustrates an example of an NVMe subsystem which includes two NVMe devices, "NVMe Device 0" and "NVMe Device 1". Each NVMe device, "NVMe Device 0" and "NVMe Device 1", includes a single corresponding NVMe controller, "NVMe Controller 0" and "NVMe Controller 1" respectively and a corresponding NVMe Storage Medium (not shown explicitly). The NVMe Storage Medium of NVMe Device 0 defines namespaces, "Namespace A" and "Namespace B". The NVMe Storage Medium of NVMe Device 1 defines namespace, "Namespace C". Each namespace "Namespace A", "Namespace B" and "Namespace C" has a corresponding namespace identifier "NSID 1", "NSID 2" and "NSID 3" respectively. As indicated by the dotted lines in FIG. 6, each NVMe controller, "NVMe Controller 0" and "NVMe Controller 1", may access one or more of the namespaces, "Namespace A", "Namespace B" and "Namespace C". Specifically, as indicated by the dotted lines in FIG. 4, namespace "Namespace A" is accessible only to "NVMe Controller 0" of "NVMe Device 0" and namespace "Namespace C" is accessible only to "NVMe Controller 1" of "NVMe Device 1", while namespace "Namespace B" is shared or accessible to both "NVMe Controller 0" and "NVMe Controller 1". Namespace sharing provides the ability for two or more different NVMe controllers to access a shared (common) namespace regardless of whether the shared namespace is defined by the same NVMe Storage Medium or by different NVMe Storage Medium, for example different NVMe Storage Medium of different NVMe Devices. As shown in FIG. 6, the NVMe Storage Medium of "NVMe Device 1" also includes an unallocated portion of non-volatile memory which is inaccessible to either of the NVMe controllers, "NVMe Controller 0" and "NVMe Controller 1".

Although the NVMeOF system 201 of FIG. 3 includes first and second NVMe devices 202a and 202b, the number of NVMe devices may be greater than two, for example the number of NVMe devices may be of the order of thousands. Furthermore, although each NVMe device 202a, 202b is described as having two NVMe controllers, in other embodiments, one or more of the NVMe devices may have more or fewer than two NVMe controllers. In addition, the NVMe devices may be interconnected in a fabric to form a NVMe subsystem such as a distributed storage entity such as a Storage Area Network (SAN).

Each namespace can have its own specific format, features, properties, attributes, functionality and/or capabilities. Namespaces may be created or deleted. Namespaces may be attached, or made accessible, to an NVMe controller of the same NVMe device or subsystem or to a different NVMe device or subsystem. Conversely, namespaces may be detached, or made inaccessible, to an NVMe controller of the same NVMe device or subsystem or to a different NVMe device or subsystem. Consequently, the visibility and/or accessibility of storage may be controlled by attaching and/or detaching namespaces to one or more of the NVMe controllers. The properties or attributes of a namespace may show that the namespace is already attached, or accessible, to one or more specific NVMe controllers, that a namespace is private (i.e. that the namespace is inaccessible to any NVMe controllers), or that a namespace is not attached, or is inaccessible, to one or more specific NVMe controllers.

Data on the NVMe devices or subsystems can be associated with metadata. The metadata may be part of the logical block or it may be transferred as a separate buffer of data. The metadata may be sensitive in nature. The formatting of the namespace may vary. Each namespace may use Logical Block Addressing (LBA). The LBA formatting may vary. An NVMe controller may support several physical formats of logical block size and associated metadata size. There may be performance differences between different physical formats.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method for use in sanitizing a network of non-volatile memory express devices, wherein each non-volatile memory express device comprises at least one controller and non-volatile memory, wherein at least a portion of the non-volatile memory of at least one of the non-volatile memory express devices is at least one of accessible to at least one controller of the same non-volatile memory express device or is accessible to at least one controller of at least one of the other non-volatile memory express devices, wherein one or more of the portions of the non-volatile memory of the non-volatile memory express devices comprise one or more namespaces, wherein at least one of the namespaces of at least one of the non-volatile memory express devices is at least one of accessible to at least one controller of the same non-volatile memory express device or is accessible to at least one controller of at least one of the other non-volatile memory express devices, and wherein the method comprises:

identifying the configuration of the network of non-volatile memory express devices including:

identifying one or more of the controllers of the non-volatile memory express devices; and identifying which portions of the non-volatile memory of the non-volatile memory express devices are accessible to which of the identified controllers including identifying one or more of the namespaces and identifying which of the identified namespaces are accessible to which of the identified controllers; and identifying any of the identified namespaces which are, at least initially, visible to one or more of the identified controllers but inaccessible to all of the identified controllers, or which are, at least initially, visible to one or more of the identified controllers but not accessible to any of the identified controllers, wherein the method further comprises making any identified one or more inaccessible namespaces accessible to at least one of the identified controllers for data erasure by performing at least one of:

assigning any identified one or more inaccessible namespaces to at least one of the identified controllers;

providing authentication to at least one of gain access to any identified one or more inaccessible namespaces or allow erasure of data stored in any identified one or more inaccessible namespaces; and at least one of acquiring or removing any reservations which at least one of prevent access to any identified one or more inaccessible namespaces or prevent erasure of data stored in any identified one or more inaccessible namespaces; and wherein the method further comprises performing a data erasure process in relation to at least one portion of the non-volatile memory of at least one of the non-volatile memory express devices based at least in part on the identified configuration of the network, wherein performing the data erasure process in relation to at least one portion of the nonvolatile memory of at least one of the non-volatile memory express devices comprises executing a data erasure procedure to erase data from the accessible namespaces of the non-volatile memory of at least one of the non-volatile memory express devices, wherein at least one of the data erasure procedure is defined in firmware or the data erasure procedure comprises writing data over data stored in the memory of one or more of the non-volatile memory express devices.

2. The method of claim 1, wherein identifying the configuration of the network of non-volatile memory express devices comprises identifying all of the controllers of the nonvolatile memory express devices of the network of non-volatile memory express devices.

3. The method of claim 1, wherein identifying the configuration of the network of non-volatile memory express devices comprises identifying which, if any, of the identified controllers are inaccessible and therefore not permitted to act in response to instructions relating to the data erasure process.

4. The method of claim 3, wherein the method comprises at least one of:
reconfiguring any one or more inaccessible controllers to make any such one or more inaccessible controllers accessible and therefore permitted to act in response to instructions relating to the data erasure process;
raising an alarm, notifying a user of, or alerting a user to, the presence of any one or more inaccessible controllers.

5. The method of claim 1, wherein identifying the configuration of the network of non-volatile memory express devices comprises identifying any one or more unallocated portions of the memory of any of the non-volatile memory express devices which are, at least initially, visible, but inaccessible, to any of the identified controllers.

6. The method of claim 5, wherein the data erasure process comprises at least one of:
assigning any one or more unallocated portions of the memory of any of the non-volatile memory express devices to at least one of the identified controllers to make any such one or more unallocated portions of the memory of any of the non-volatile memory express devices accessible to at least one of the identified controllers;
raising an alarm, notifying a user of, or alerting a user to, the presence of any one or more unallocated portions of the memory of any of the non-volatile memory express devices.

7. The method of claim 1, wherein identifying the configuration of the network of non-volatile memory express devices comprises identifying a measure of health of one or more of the non-volatile memory express devices.

8. The method of claim 1, wherein identifying the configuration of the network of non-volatile memory express devices comprises identifying the configuration of any partitions in the memory of one or more of the non-volatile memory express devices.

9. The method claim 1, wherein identifying the configuration of the network of non-volatile memory express devices comprises identifying all of the namespaces of the non-volatile memory express devices of the network of non-volatile memory express devices.

10. The method of claim 1, wherein identifying the configuration of the network of non-volatile memory express devices comprises identifying, for each identified controller, all of the namespaces which are accessible to the identified controller.

11. The method of claim 1, wherein the data erasure process comprises raising an alarm, notifying a user of, or alerting a user to, the presence of any one or more inaccessible namespaces.

12. The method claim 1, wherein identifying the configuration of the network of non-volatile memory express devices comprises identifying, for each identified namespace or each namespace in relation to which the data erasure process is to be performed, one or more properties of the namespace including at least one of:
formatting information such as logical block addressing (LBA) formatting information;
metadata;
protection information;
an indication of whether the names pace is shared or private;
an indication of whether the namespace is active or inactive;
an indication of whether end-to-end protection is enable or disabled;
an indication of any one or more data erasure procedures suitable for erasing data from the namespace;
an indication of any one or more data erasure procedures supported by one or more of the controllers to which the namespace is accessible; or
an indication of any one or more data erasure procedures supported by the non-volatile memory express device which includes the non-volatile memory which defines the namespace.

13. The method of claim 12, wherein the data erasure process comprises selecting, for each namespace in relation to which the data erasure process is to be performed, a data erasure procedure based at least in part on the identified one or more properties of the namespace.

14. The method of claim 12, wherein the data erasure process comprises selecting, for each namespace in relation to which the data erasure process is to be performed, a data erasure procedure based at least in part on a required erasure standard for the namespace.

15. The method of claim 1, wherein the data erasure procedure comprises at least one of:
a native data erasure procedure;
a cryptographic data erasure procedure;
applying a Force Unit Access (FUA) flag to force data to be written over data stored in the memory of one or more of the non-volatile memory express devices during execution of the data erasure procedure; or
atomic-writing data over data stored in the memory of one or more of the non-volatile memory express devices.

16. The method of claim 1, wherein identifying the configuration of the network of non-volatile memory express devices comprises identifying the presence or availability of a namespace management interface, and the method further comprises, responsive to identifying the presence or availability of a namespace management interface:
recording an initial configuration of the identified controllers and the identified namespaces;

modifying the initial configuration of the identified controllers and the identified namespaces before performing the data erasure process in relation to at least one of the identified namespaces; and restoring the initial configuration of the identified controllers and the identified namespaces after performing the data erasure process in relation to at least one of the identified namespaces.

17. The method of claim 16, wherein modifying the initial configuration of the identified controllers and the identified namespaces comprises creating a single or global namespace which is accessible to at least one of the identified controllers and which includes all of the addressable locations in the memories of the non-volatile memory express devices.

18. The method of claim 1, wherein the non-volatile memory express devices are configured for communication with each other via at least one of:
Ethernet;
Fibre Channel;
TCP/IP InfiniBand; and
Remote Direct Memory Access (RDMA); or
wherein the network of non-volatile memory express devices comprises an NVM Express over Fabrics (NVMeOF) system.

19. A data management apparatus for use in sanitizing a network of non-volatile memory express devices comprising:
each of the non-volatile memory express devices includes at least one controller and non-volatile memory;
wherein at least a portion of the nonvolatile memory of at least one of the non-volatile memory express devices is accessible to at least one of at least one controller of the same non-volatile memory express device at least one controller of at least one of the other non-volatile memory express devices;
wherein the data management apparatus is configured for communication with each of the non-volatile memory express devices; and
wherein the data management apparatus further comprises a processing resource and a memory, the memory storing instructions which, when executed by the processing resource, causes the data management apparatus to perform the steps comprising:
identifying the configuration of the network of non-volatile memory express devices including:
identifying one or more of the controllers of the non-volatile memory express devices; and identifying which portions of the non-volatile memory of the non-volatile memory express devices are accessible to which of the identified controllers including identifying one or more of the namespaces and identifying which of the identified namespaces are accessible to which of the identified controllers; and identifying any of the identified namespaces which are, at least initially, visible to one or more of the identified controllers but inaccessible to all of the identified controllers, or which are, at least initially, visible to one or more of the identified controllers but not accessible to any of the identified controllers, wherein the steps further comprise making any identified one or more inaccessible namespaces accessible to at least one of the identified controllers for data erasure by performing at least one of:

assigning any identified one or more inaccessible namespaces to at least one of the identified controllers;

providing authentication to at least one of gain access to any identified one or more inaccessible namespaces or allow erasure of data stored in any identified one or more inaccessible namespaces; and at least one of acquiring or removing any reservations which at least one of prevent access to any identified one or more inaccessible namespaces or prevent erasure of data stored in any identified one or more inaccessible namespaces; and wherein the method further comprises performing a data erasure process in relation to at least one portion of the non-volatile memory of at least one of the non-volatile memory express devices based at least in part on the identified configuration of the network, wherein performing the data erasure process in relation to at least one portion of the nonvolatile memory of at least one of the non-volatile memory express devices comprises executing a data erasure procedure to erase data from the accessible namespaces of the non-volatile memory of at least one of the non-volatile memory express devices, wherein at least one of the data erasure procedure is defined in firmware or the data erasure procedure comprises writing data over data stored in the memory of one or more of the non-volatile memory express devices.

\* \* \* \* \*